Aug. 10, 1965  F. S. NAPOLI  3,199,183

METHOD OF APPLYING WELDING STUDS TO WORKPIECE

Filed Oct. 14, 1963

INVENTOR
FRANCIS S. NAPOLI

BY *Mason, Mason & Albright*
ATTORNEYS 3,199,183
METHOD OF APPLYING WELDING STUDS
TO WORKPIECE
Francis S. Napoli, Troy, Mich., assignor to Lattner Bros.
Machining Co., Ferndale, Mich., a partnership
Filed Oct. 14, 1963, Ser. No. 315,828
5 Claims. (Cl. 29—423)

This invention relates to a method of applying metallic weld studs to a metallic panel with the assistance of a jig holding a perforated tape in front of the workpiece wherein weld studs have been inserted in the perforated tape, such weld studs having a predetermined position. More particularly, the invention relates to such a method of applying weld studs which will act as fasteners for decorative trim on vehicles, appliances, or like articles, by the provision of a perforated tape having a plurality of weld studs located thereon in accordance with the requirements of the particular application and a jig which carries such tape and is placed adjacent the workpiece wherein the studs are to be applied.

The application of decorative trim, emblems and the like by present methods frequently adds substantially to the labor costs for production of the article concerned. For articles mass produced, the general practice is to drill a series of holes in which clips are inserted and the trim is thereafter applied on the clips. Such holes can be accurately drilled with a jig in multiples or by hand. It has been discovered that a dependable and, taking into account the overall costs, less expensive trim can be applied with improved results by the utilization of weld studs rather than holes in the work piece. However, a disadvantage to such application is the time consumed for the proper positioning of the weld studs relative to the workpiece.

It is, accordingly, an object of this invention to provide a labor-saving method for applying weld studs in accurate, predetermined positions to suit the requirements of the particular application. It is a further object of this invention to provide a method for the application of weld studs to a work-piece which is particularly adaptable to mass production methods wherein articles are carried by conveyor means.

It is a still further object of this invention that such a method be applicable to articles carried in sequence by conveyor means wherein such articles will not all be identical.

Other objects and advantages of the present invention will be obvious to those skilled in the art from the following detailed description of a preferred embodiment of the invention and from the attached drawings of which:

Figure 1:
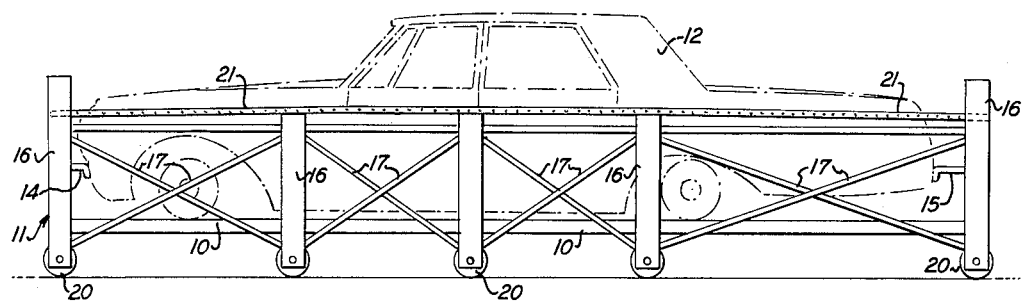
FIGURE 1 shows the jig of the invention applied to the chassis of an automobile carried on a body buck.
Figure 2:
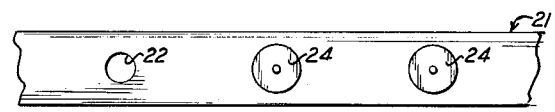
FIGURE 2 is a plan view of a perforated tape having weld studs inserted therein.
Figure 3:
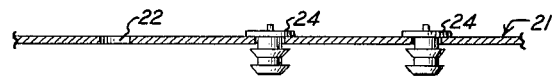
FIGURE 3 is a side elevation of the tape shown in FIGURE 2.

In the figures, a conventional conveyor means used to carry automobiles in a production is indicated by the reference character 10. A jig 11 is set up adjacent to the workpiece 12 which, in this case, comprises the chassis of an automobile. The jig 11 is connected by clamps 14 and 15 or other appropriate means to the body of the work piece 12.

The jig 11 has a plurality of stanchions 16 and brace members 17. Ground-engaging means comprising wheels 20 are mounted on the lower ends of the stanchions 16. Attached to the upper portions of the stanchions 16 in a predetermined position is a tape 21 which has a plurality of openings 22 with a plurality of welding studs 24 inserted therein. The studs 24 are either adjacent to or are in contact with the surface of the workpiece 12.

In operation, the tape 21 is previously made up and the studs 24 inserted therein in accordance with the known requirements of the particular workpiece 12 involved. The tape 21 together with the studs 24 is then attached to the jig 11, the position of such attachment again being in accordance with previously determined requirements for the workpiece 12. Jig 11 is then placed adjacent to the workpiece 12 as shown in FIGURE 1 with clamps 14 and 15 engaging such workpiece. In such a position the studs 24 are welded to the workpiece 12 by means of the conventional portable stud welding unit. Following completion of such welding of the studs 24 to the workpiece 12, the tape 21 together with the jig 11 is easily removed from the vicinity of the workpiece, leaving studs 24 affixed to workpiece 12. However, tape 21 may be merely detached from the jig 11 and left in place on workpiece 12 as a guard in subsequent sanding operations or as material to underlie the molding.

The tape 21 may, within practical limits, have any specified width and thickness as may be desired. It has been found practical to make such tape of plastic but it may be also composed of paper and other suitable material.

The workpiece 12 is subsequently painted or otherwise finished if desired and decorative trim is applied to the studs 24 of the workpiece.

The jig 11 is of a specific design to suit the particular application. Where the conveyor means will present from time to time non-identical workpieces 12, jigs of several designs are kept readily at hand for each particular application. It is important that the jig 11 be firmly connected to the workpiece 12 while the studs 24 are being welded thereon.

The foregoing detailed description has been given for clearness of understanding only, and no unnecessary limitations should be understood therefrom, for modifications will be obvious to those skilled in the art.

Having thus described my invention, what I claim as new and desire to secure by Letters Patent of the United States is:

1. The method of applying weld studs to a workpiece which comprises the steps of inserting a plurality of weld studs into holes in a flexible stud carrier means in predetermined positions, attaching said carrier means to a jig, placing said jib adjacent said workpiece, securing said jig and carrier adjacent said workpiece, welding said studs on said workpiece and removing the jig from said workpiece.

2. The method of applying weld studs to a workpiece which comprises the steps of preparing a flexible tape with a plurality of openings therein, inserting a plurality of weld studs into said openings, attaching said tape to a jig, placing said jig adjacent said workpiece, securing said jig and carrier to said workpiece, welding said studs on said workpiece and removing the jig from said workpiece.

3. A method in accordance with claim 1 with the additional step of removing said tape together with said jig from said workpiece.

4. A method of applying decorative trim to a workpiece which comprises the steps of preparing a flexible tape with a plurality of openings in predetermined positions, inserting a plurality of weld studs into said openings, attaching said tape to a jig, placing said jib adjacent to said workpiece and clamping it thereto, welding said studs on said workpiece, removing the jig from said workpiece and applying decorative trim to said studs.

5. A method of applying decorative trim to a workpiece which comprises the steps of preparing a flexible tape with a plurality of holes, inserting a plurality of weld studs into said holes at predetermined positions, attaching said tape to a jig, clamping said jig adjacent said workpiece, welding said studs on said workpiece, removing said jig together with said tape from said workpiece, applying paint to said workpiece, and placing trim onto said studs.

References Cited by the Examiner
UNITED STATES PATENTS

| | | | |
|---|---|---|---|
| 1,094,910 | 4/14 | Lachman | 219—106 |
| 3,015,884 | 1/62 | Chamberlain | 29—423 |

WHITMORE A. WILTZ, *Primary Examiner.*